US011502741B2

(12) United States Patent
Chang et al.

(10) Patent No.: US 11,502,741 B2
(45) Date of Patent: Nov. 15, 2022

(54) METHOD FOR DEPLOYING ELECTROMAGNETIC WAVE GUIDING STRUCTURE

(71) Applicant: NATIONAL CHUNG CHENG UNIVERSITY, Chiayi County (TW)

(72) Inventors: Sheng-Fuh Chang, Chiayi County (TW); Chia-Chan Chang, Chiayi (TW); Shih-Cheng Lin, Taitung (TW); Yuan-Chun Lin, Hsinchu County (TW)

(73) Assignee: National Chung Cheng University, Minxiong Township (TW)

( * ) Notice: Subject to any disclaimer, the term of this patent is extended or adjusted under 35 U.S.C. 154(b) by 0 days.

(21) Appl. No.: 17/372,709

(22) Filed: Jul. 12, 2021

(65) Prior Publication Data

US 2022/0247479 A1     Aug. 4, 2022

(30) Foreign Application Priority Data

Feb. 2, 2021 (TW) .................................. 110103859

(51) Int. Cl.
*H04B 7/14*     (2006.01)
*H04B 7/145*     (2006.01)
*H01Q 15/14*     (2006.01)
*H04B 17/318*     (2015.01)

(52) U.S. Cl.
CPC ............. *H04B 7/145* (2013.01); *H01Q 15/14* (2013.01); *H04B 17/318* (2015.01)

(58) Field of Classification Search
CPC ........ H04B 7/14; H04B 7/145; H04B 17/318; H01Q 1/007; H01Q 15/14
See application file for complete search history.

(56) References Cited

U.S. PATENT DOCUMENTS

| 2019/0363447 | A1 | 11/2019 | Pelletti et al. |
| 2020/0287626 | A1* | 9/2020 | Bowler ..................... H04B 1/44 |
| 2020/0364187 | A1* | 11/2020 | Tran ........................ H04W 64/00 |
| 2020/0370890 | A1* | 11/2020 | Hamilton ................. G08G 1/04 |
| 2021/0242606 | A1* | 8/2021 | Sepulveda .............. H01Q 1/38 |
| 2022/0159725 | A1* | 5/2022 | Liu ...................... H04W 74/008 |

* cited by examiner

*Primary Examiner* — Thanh C Le
(74) *Attorney, Agent, or Firm* — Rosenberg, Klein & Lee

(57) ABSTRACT

A method for deploying an electromagnetic wave guiding structure includes a communication dead zone analysis step and an improvement measure determination step. In the former step, a frequency band in use and an electromagnetic wave signal strength threshold value are preset, and a processing module creates an electromagnetic map for the electromagnetic wave intensity over an area in the frequency band in use based on an electronic map of the area, wherein the electromagnetic map shows a communication dead zone. In the latter step, the processing module obtains an existing electromagnetic wave path according to the electromagnetic map and infers from the existing electromagnetic wave path the installation position and type of at least one electromagnetic wave guiding structure assembly suitable for use to guide the electromagnetic wave to the communication dead zone and ensure that the coverage ratio of the electromagnetic wave in the area reaches a threshold value.

13 Claims, 16 Drawing Sheets

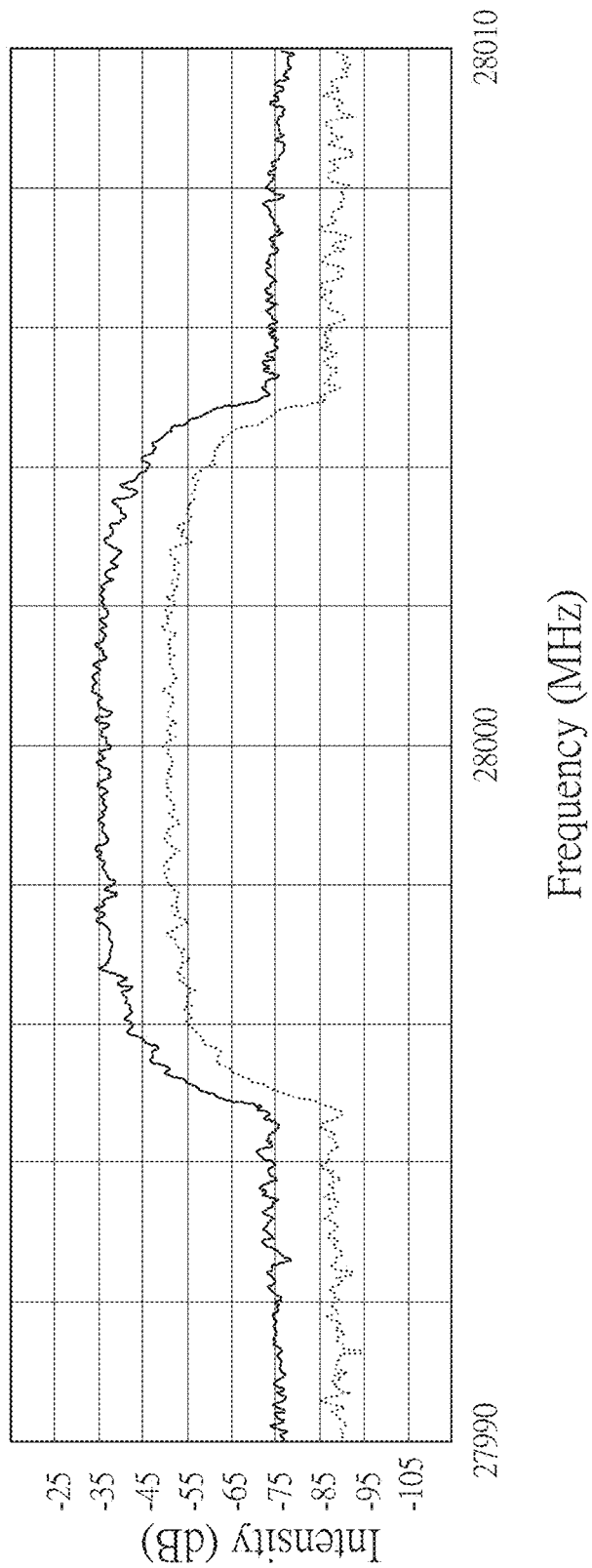
F I G. 7C

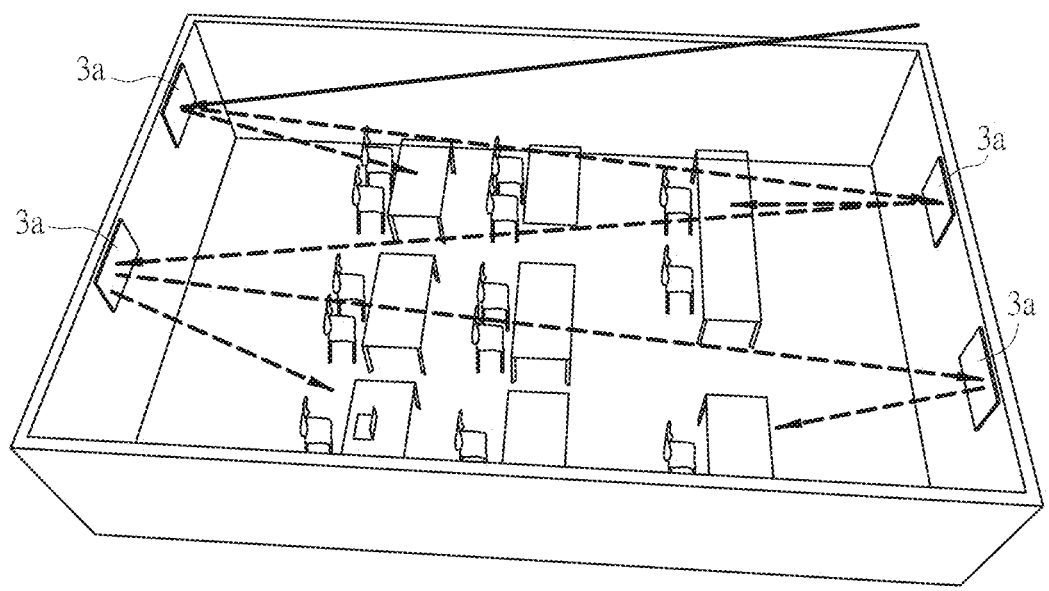
F I G. 11
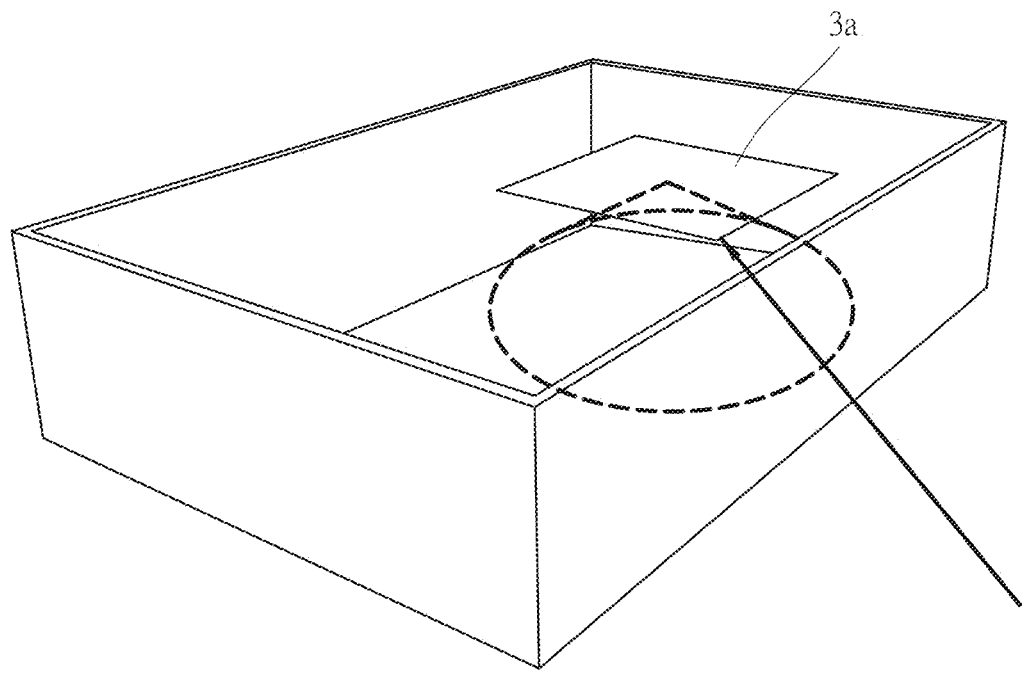
F I G. 12

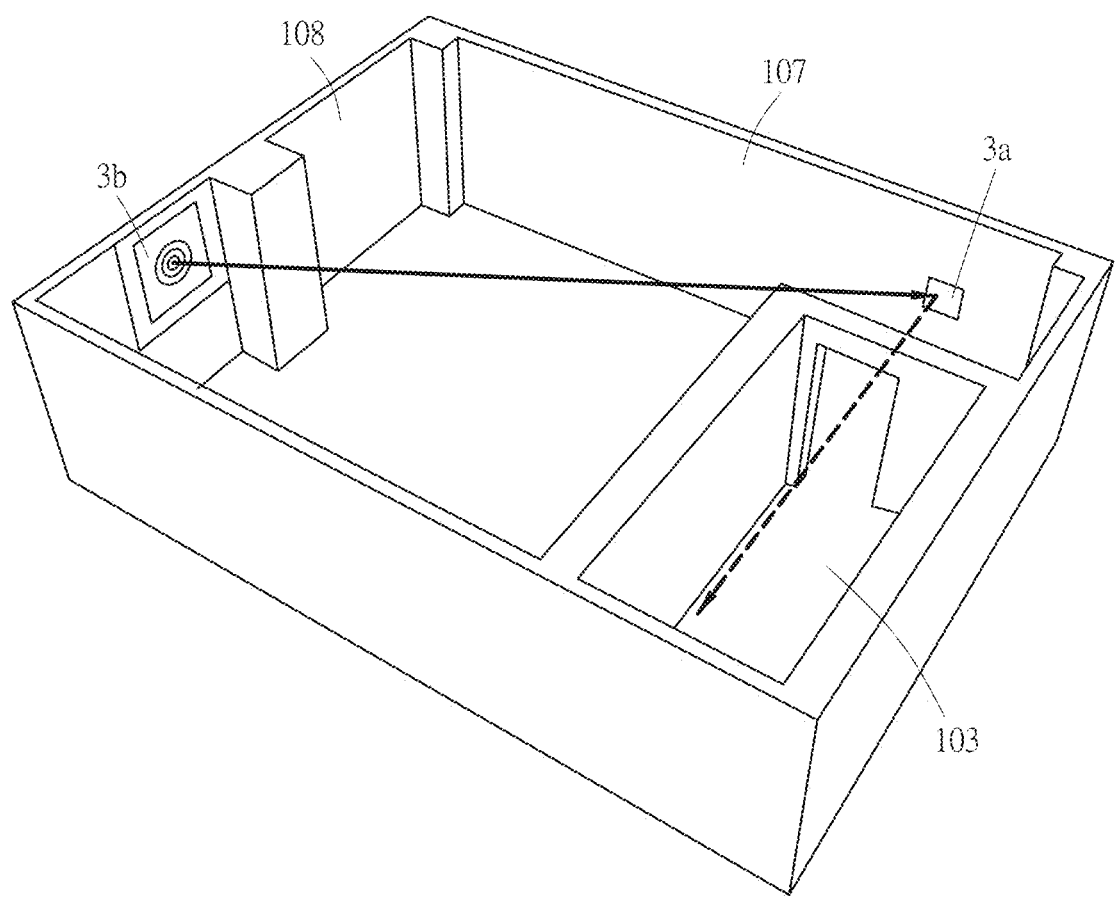
F I G . 14A

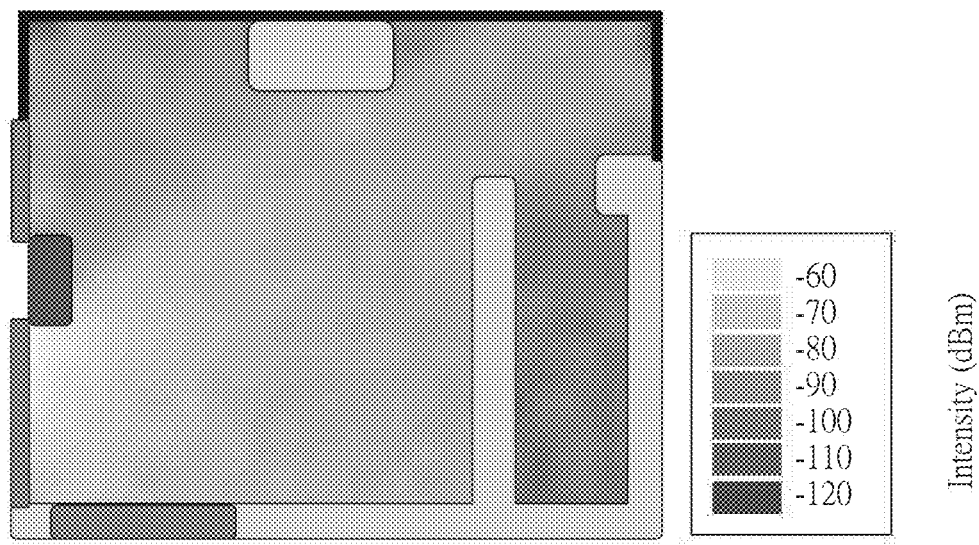
F I G . 14B
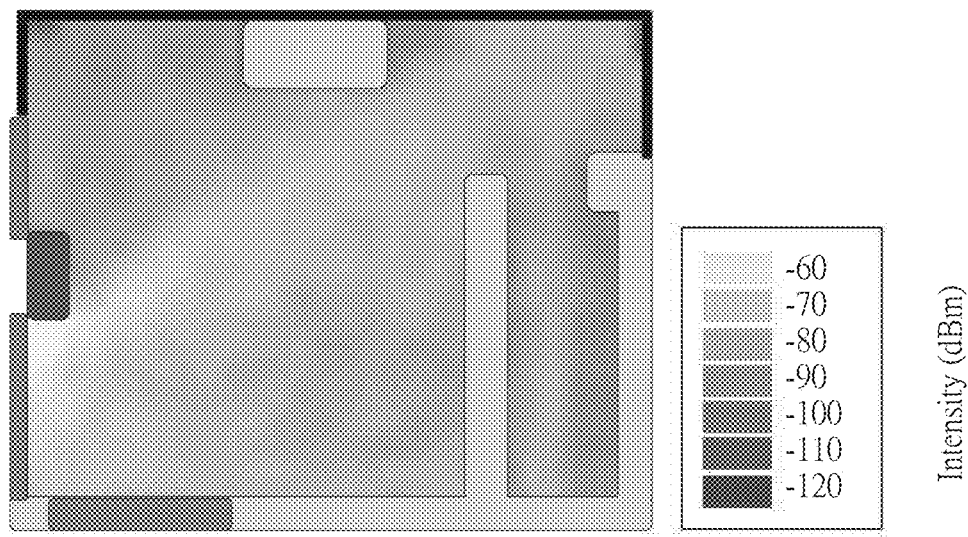
F I G . 14C

METHOD FOR DEPLOYING ELECTROMAGNETIC WAVE GUIDING STRUCTURE

BACKGROUND OF THE DISCLOSURE

1. Technical Field

This disclosure relates to a method and more particularly to a method for deploying an electromagnetic wave guiding structure in order to guide an electromagnetic wave to a communication dead zone.

2. Description of Related Art

Recently, the application of radio waves in electronic products has gradually increased. Many a family uses several mobile phones, several laptop computers, and a variety of intelligent home appliances that employ radio waves. While the application of radio waves brings about conveniences in our daily lives, the quality of communication has been an issue in such applications.

The coverage area of a base station for receiving and transmitting radio waves is planned by the corresponding communication service provider, and communication dead zones are formed either because radio waves to and from the neighboring base stations are blocked by barriers or because those zones are in a building erected after the coverage areas of the neighboring base stations are planned. It has long been an important research subject in the radio wave-related fields to find ways to eliminate communication dead zones and enhance the quality of communication effectively.

BRIEF SUMMARY OF THE DISCLOSURE

To eliminate the communication dead zones in an area and thereby enhance the quality of communication in that area, the inventor of the present disclosure provides a method for deploying an electromagnetic wave guiding structure as disclosed herein.

The method for deploying an electromagnetic wave guiding structure includes a communication dead zone analysis step and an improvement measure determination step.

The communication dead zone analysis step is carried out as follows, with a frequency band in use and an electromagnetic wave signal strength threshold value being set in advance. An electromagnetic map showing the electromagnetic wave intensity over an area in the frequency band in use is created by a processing module according to an electronic map of the area. The electromagnetic map shows a communication dead zone, which is a region of the area that has an electromagnetic wave intensity lower than the electromagnetic wave signal strength threshold value. The improvement measure determination step is carried out as follows. An existing electromagnetic wave path is obtained by the processing module according to the electromagnetic map. Then, the processing module infers from the existing electromagnetic wave path the installation position and type of at least one electromagnetic wave guiding structure assembly suitable for use to guide an electromagnetic wave from the existing electromagnetic wave path to the communication dead zone and to render the coverage ratio of the electromagnetic wave in the communication dead zone equal to or higher than a coverage ratio threshold value. Each electromagnetic wave guiding structure assembly includes at least one electromagnetic wave guiding structure, and each electromagnetic wave guiding structure includes at least one of an electromagnetic wave reflection structure, an electromagnetic wave transmission structure, and an electromagnetic wave bypass structure. The electromagnetic wave can be reflected by each electromagnetic wave reflection structure when impinging thereon, can pass through each electromagnetic wave transmission structure while undergoing convergence of energy, and can move around each electromagnetic wave bypass structure after impinging on and before leaving the electromagnetic wave bypass structure.

BRIEF DESCRIPTION OF THE SEVERAL VIEWS OF THE DRAWINGS

FIG. 7C is a measurement diagram, or more particularly a spectrogram, showing the electromagnetic wave intensities detected before and after the electromagnetic wave transmission structure in FIG. 5 is deployed;

FIG. 11 schematically shows the second embodiment of the disclosed method for deploying an electromagnetic wave guiding structure;

FIG. 12 schematically shows a variant of the second embodiment of the disclosed method for deploying an electromagnetic wave guiding structure;

FIG. 14A schematically shows a variant of the third embodiment of the disclosed method for deploying an electromagnetic wave guiding structure;

FIG. 14B is a before-deployment electromagnetic map of the third embodiment;

FIG. 14C is an after-deployment electromagnetic map of the third embodiment.

DETAILED DESCRIPTION OF THE DISCLOSURE

The foregoing technical features are incorporated into the method disclosed herein for deploying an electromagnetic wave guiding structure. The major effects of the method will be demonstrated below by a number of embodiments.

Figure 1:
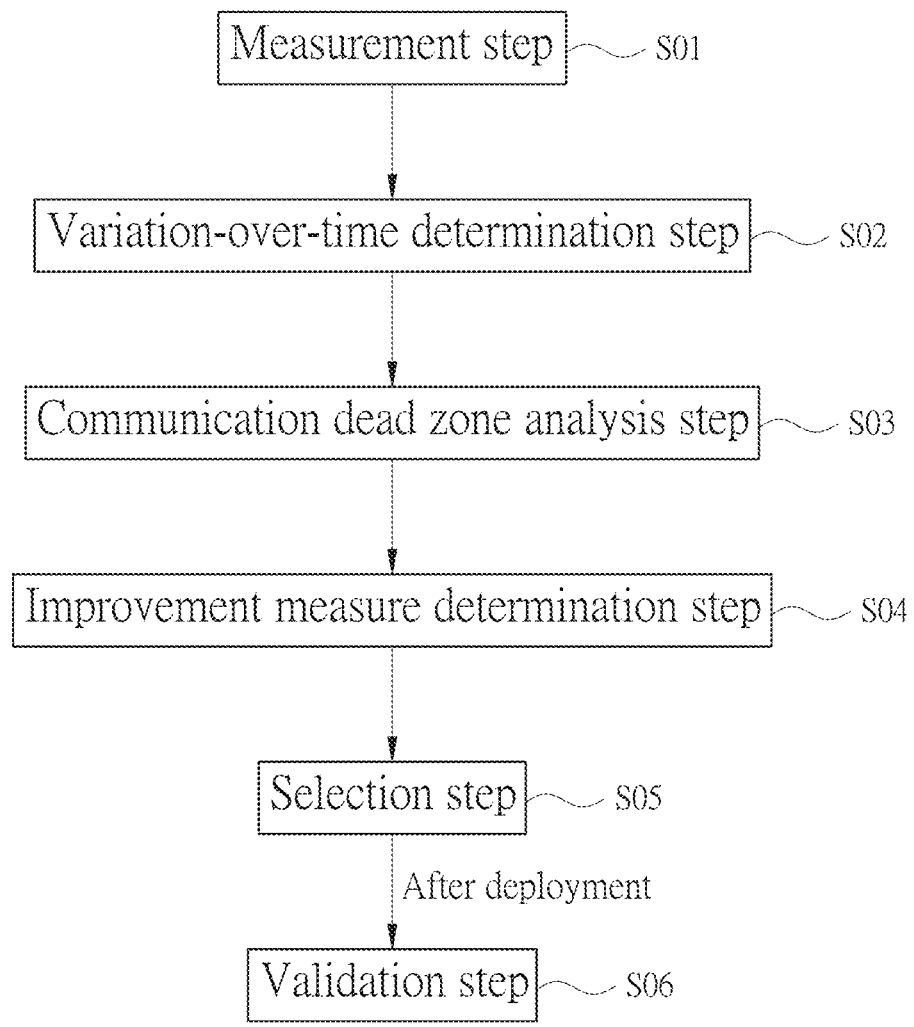
FIG. 1 is a flowchart showing the process flow of the disclosed method for deploying an electromagnetic wave guiding structure.
Figure 2:
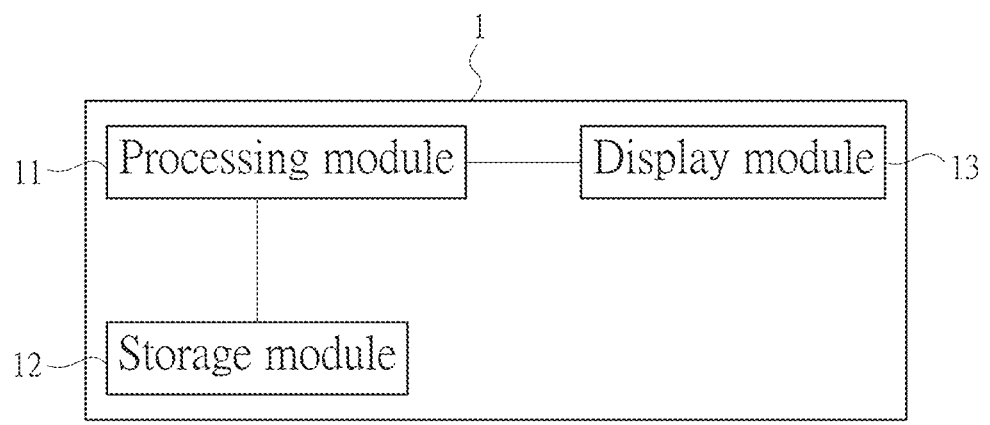
FIG. 2 is a block diagram of the electronic computation device used in the disclosed method for deploying an electromagnetic wave guiding structure.
Figure 3:
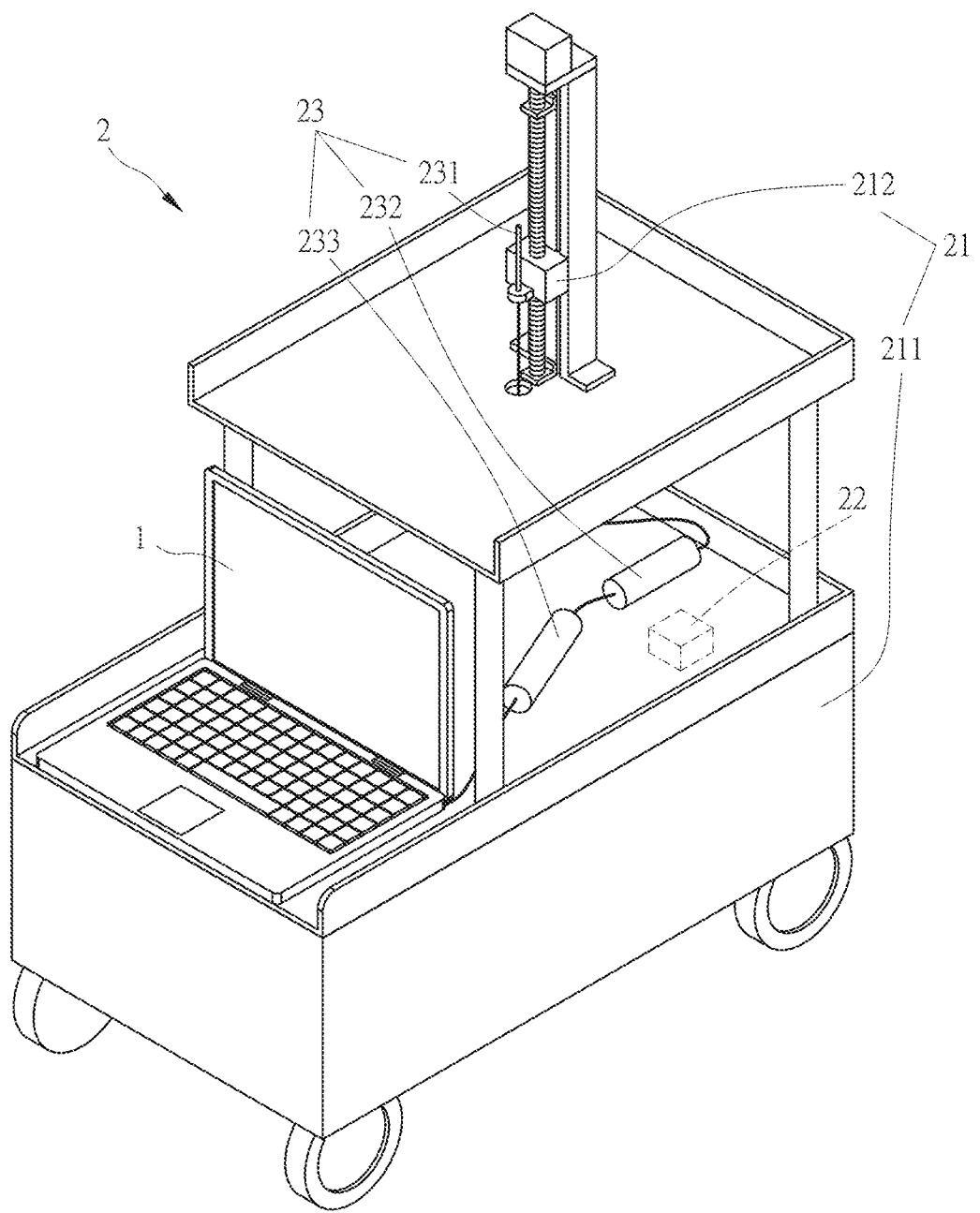
FIG. 3 is a perspective view of the electronic computation device and the detection apparatus used in the disclosed method for deploying an electromagnetic wave guiding structure.

Referring to FIG. 1 to FIG. 3, the disclosed method for deploying an electromagnetic wave guiding structure is performed by an electronic computation device 1 and a detection apparatus 2. The method for deploying an electromagnetic wave guiding structure includes a measurement step S01, a variation-over-time determination step S02, a communication dead zone analysis step S03, an improvement measure determination step S04, a selection step S05, and a validation step S06. The method for deploying an electromagnetic wave guiding structure is designed to infer at least one electromagnetic wave guiding structure assembly suitable for use in an area and then select one electromagnetic wave guiding structure assembly from at least one electromagnetic wave guiding structure assembly suitable for use.

The electronic computation device 1 includes a processing module 11, a storage module 12, and a display module 13. The processing module 11 is electrically connected to the storage module 12 and the display module 13.

Figure 4:
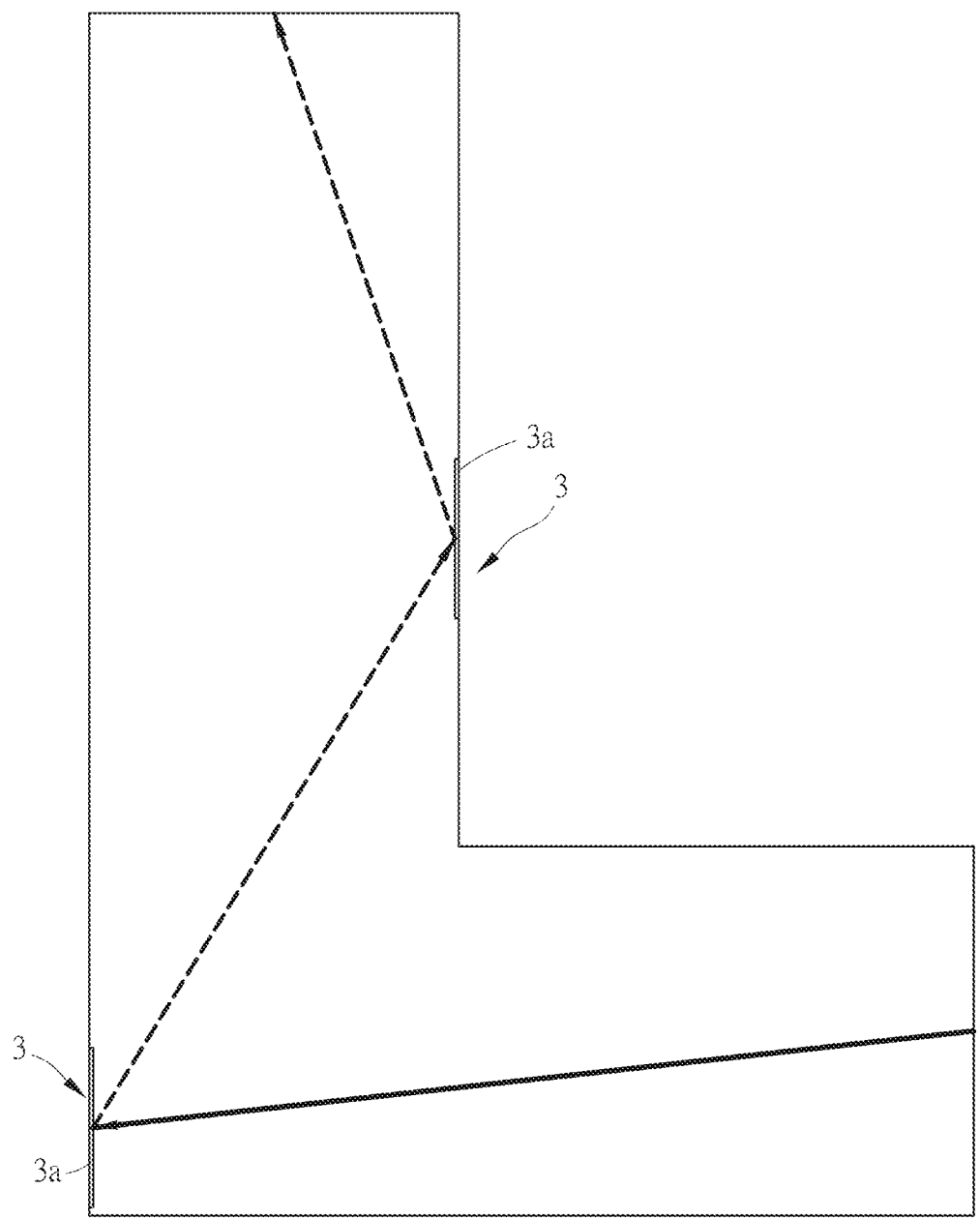
FIG. 4 schematically shows a couple of electromagnetic wave reflection structures deployed as inferred by the disclosed method for deploying an electromagnetic wave guiding structure.
Figure 5:
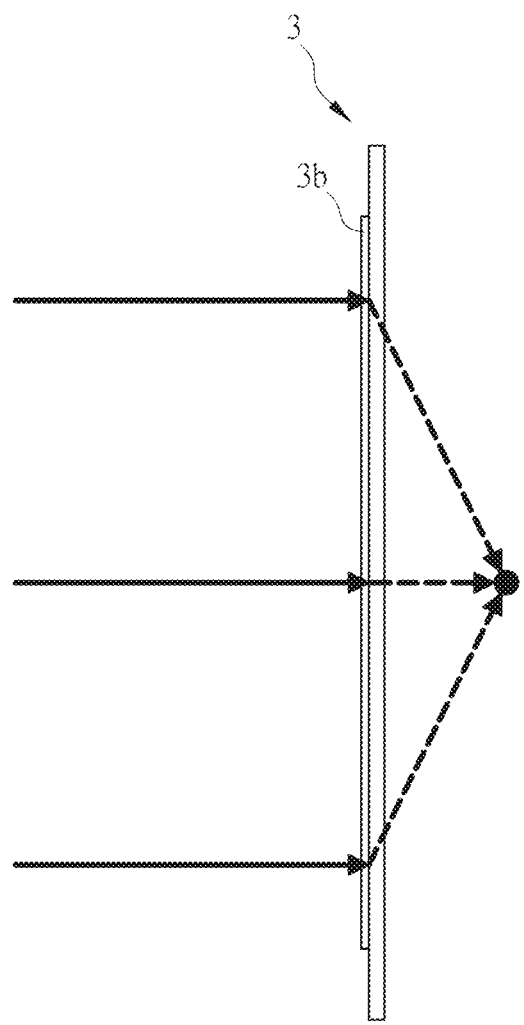
FIG. 5 schematically shows an electromagnetic wave transmission structure deployed as inferred by the disclosed method for deploying an electromagnetic wave guiding structure.
Figure 6:
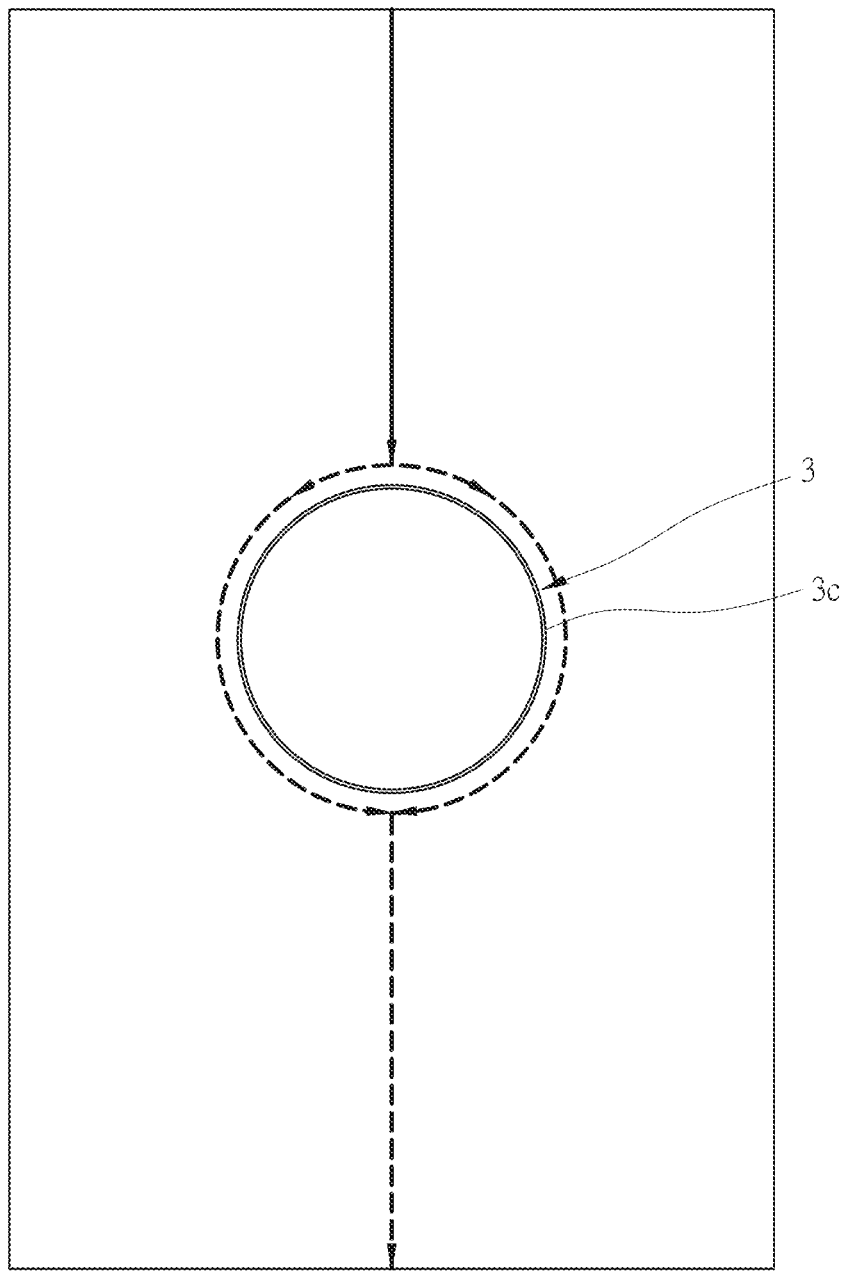
FIG. 6 schematically shows an electromagnetic wave bypass structure deployed as inferred by the disclosed method for deploying an electromagnetic wave guiding structure.

Referring to FIG. 4 to FIG. 6, each electromagnetic wave guiding structure assembly includes at least one electromagnetic wave guiding structure 3, and each electromagnetic wave guiding structure 3 includes at least one of an electromagnetic wave reflection structure 3a, an electromagnetic wave transmission structure 3b, and an electromagnetic wave bypass structure 3c.

As shown in FIG. 4, an electromagnetic wave is reflected by an electromagnetic wave reflection structure 3a when impinging thereon. The electromagnetic wave reflection structure 3a radiates the electromagnetic wave over an extent of a first conical shape. The apex of the first conical shape is defined by the electromagnetic wave reflection structure 3a, and the height of the first conical shape and the generatrix of the first conical shape form an included angle defined as a first included angle. In this embodiment, the first included angle can be 60° at most. The structural configuration of the electromagnetic wave reflection structure 3a is not an essential feature in this disclosure and therefore will not be described in more detail herein. Please refer to Taiwan Invention Patent Application No. 109125161 for one such structural configuration.

Reference is now made to FIG. 5. An electromagnetic wave impinging on the electromagnetic wave transmission structure 3b passes through the electromagnetic wave transmission structure 3b and undergoes convergence of energy at the same time such that the intensity of the electromagnetic wave is increased after the electromagnetic wave passes through the electromagnetic wave transmission structure 3b. The electromagnetic wave transmission structure 3b must be installed on a barrier that satisfies a low-loss condition. In this embodiment, the low-loss condition requires that the barrier have a dielectric loss of less than 0.02 and a thickness equal to or less than 2 cm. The barrier, therefore, may be a glass window, lightweight partition, fiber-reinforced plastic wall, or fiber-reinforced plastic door not thicker than 2 cm, without limitation. The electromagnetic wave transmission structure 3b radiates the electromagnetic wave over an extent of a second conical shape. The apex of the second conical shape is defined by the electromagnetic wave transmission structure 3b, and the height of the second conical shape and the generatrix of the second conical shape form an included angle defined as a second included angle. In this embodiment, the second included angle can be 25° at most. The structural configuration of the electromagnetic wave transmission structure 3b is not an essential feature in this disclosure and therefore will not be described in more detail herein. Please refer to Taiwan Invention Patent Application No. 110103068 for one such structural configuration.

Figure 7A:
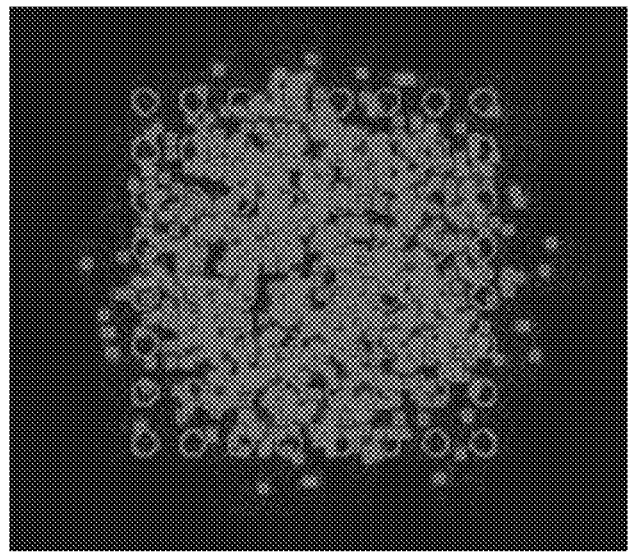
FIG. 7A is a measurement diagram, or more particularly a constellation diagram, obtained before the electromagnetic wave transmission structure in FIG. 5 is deployed.
Figure 7B:
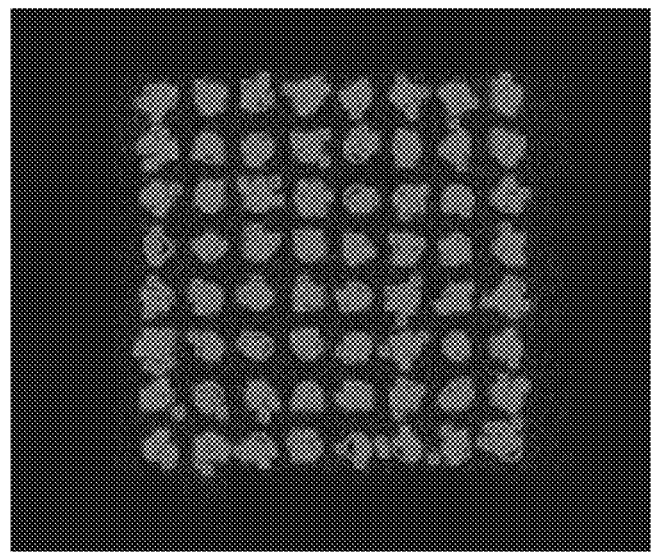
FIG. 7B is a measurement diagram, or more particularly a constellation diagram, obtained after the electromagnetic wave transmission structure in FIG. 5 is deployed.

A transmission test is carried out on the electromagnetic wave transmission structure 3b in FIG. 5 by installing the electromagnetic wave transmission structure 3b on a glass window and using an electromagnetic wave in the 28 GHz frequency band. The test results are shown in FIG. 7A, FIG. 7B, and FIG. 7C. Before the electromagnetic wave transmission structure 3b is installed, the electromagnetic wave produces a highly divergent constellation diagram, with the error vector magnitude (EVM) being −20.9 dB. Once the electromagnetic wave transmission structure 3b is installed, the constellation diagram of the electromagnetic wave becomes more concentrated, with the EVM reduced to −28 dB, and the electromagnetic wave intensity increased by 14 dB. Thus, passing the electromagnetic wave through the electromagnetic wave transmission structure 3b does contribute to increasing the electromagnetic wave intensity.

Referring to FIG. 6, an electromagnetic wave impinging on the electromagnetic wave bypass structure 3c moves around, and along the periphery of, the electromagnetic wave bypass structure 3c before leaving the electromagnetic wave bypass structure 3c. Therefore, a barrier may be covered or coated with the electromagnetic wave bypass structure 3c in order for an electromagnetic wave to move around the electromagnetic wave bypass structure 3c and thus bypass the barrier. There are no limitations on the material, size, or shape of the barrier. The electromagnetic wave bypass structure 3c radiates an electromagnetic wave over an extent of a third conical shape. The apex of the third conical shape is defined by the electromagnetic wave bypass structure 3c, and the height of the third conical shape and the generatrix of the third conical shape form an included angle defined as a third included angle. In this embodiment, the third included angle can be 60° at most. The structural configuration of the electromagnetic wave bypass structure 3c is not an essential feature in this disclosure and therefore will not be described in more detail herein. Please refer to Taiwan Invention Patent Application No. 109128106 for one such structural configuration.

It is worth mentioning that each electromagnetic wave guiding structure 3 may be an electromagnetic wave reflection structure 3a, or an electromagnetic wave transmission structure 3b, or an electromagnetic wave bypass structure 3c, or a compound structure formed by at least two of an electromagnetic wave reflection structure 3a, an electromagnetic wave transmission structure 3b, and an electromagnetic wave bypass structure 3c.

As shown in FIG. 3, the detection apparatus 2 includes a moving device 21, a locating device 22, and a detecting device 23. The moving device 21 can move in an area in an automatic yet controlled manner. The moving device 21 includes a main body 211 and a supporting base 212. The supporting base 212 is provided on the main body 211. The locating device 22 is provided in the moving device 21. The detecting device 23 is provided on the moving device 21. The detecting device 23 includes a receiving element 231, a radio-frequency (RF) front-end circuit 232, and a power sensor 233. The receiving element 231 is an antenna. The receiving element 231 is configured to receive an electromagnetic wave. The RF front-end circuit 232 receives a signal of the electromagnetic wave from the receiving element 231, processes the signal into a signal readable by the power sensor 233, and sends the latter signal to the power sensor 233. The power sensor 233 senses the electromagnetic wave intensity. The main body 211 can move in a horizontal plane in the area in a controlled manner. The supporting base 212 can move the receiving element 231 in a controlled manner at least in a height direction perpendicular to the horizontal plane. Preferably, the supporting base 212 can move not only in the height direction, but also in a direction parallel to the horizontal plane. In this embodiment, the main body 211 is an unmanned carrier, the supporting base 212 is a uniaxial slide, and the horizontal plane is the floor. It should be pointed out that the supporting base may be a triaxial slide or a robotic arm instead, without limitation, provided that the supporting base has a structure for moving the receiving element 231 at least in the height direction and for allowing the position of the receiving element 231 to be adjusted in the height direction so that while measuring the electromagnetic wave intensity, the detecting device 23 can detect variations of the electromagnetic wave intensity in the height direction more accurately. The moving device 21 may also be an unmanned aerial vehicle, or drone, configured to move in a controlled manner in the horizontal plane in the area and in the height direction so that detection by the detecting device 23 is subject to few limitations in the height direction. The locating device 22 generates locating coordinates according to each of a plurality of fixed points in the area to which the moving device 21 has moved. The locating device 22 may be, for example, a radar device or a lidar device, without limitation. The detecting device 23 measures the electromagnetic wave intensity at each fixed point.

Referring to FIG. 1 to FIG. 3, the measurement step S01 includes moving the detection apparatus 2 in the area in order for the detection apparatus 2 to detect the electromagnetic wave intensity at each fixed point in the area in a preset frequency band in use. By moving the moving device 21 to each fixed point in the area, and by moving the receiving element 231 in the height direction via the supporting base 212 if there are barriers on the floor of the area, dead zones of measurement can be reduced. When the moving device 21 arrives at any of the fixed points, the locating device 22 generates the locating coordinates of the fixed point, and the detecting device 23 measures the electromagnetic wave intensity at the fixed point. In this embodiment, the locating coordinates generated by the locating device 22 and the electromagnetic wave intensities measured by the detection apparatus 2 are both sent to the storage module 12 for storage. The processing module 11 receives the locating coordinates from the storage module 12 and creates an electronic map of the area according to the locating coordinates and the material of each barrier in the area.

The variation-over-time determination step S02 is performed as follows. The processing module 11 determines if the electromagnetic wave intensity at each fixed point in the area in the frequency band in use varies over time at a variation frequency higher than a variation frequency threshold value. If the variation frequency at a certain fixed point in the area is higher than the variation frequency threshold value, the processing module 11 will set the lowest value of the varying electromagnetic wave intensity at that fixed point (i.e., the disturbed electromagnetic wave intensity) as to-be-processed data, but if the variation frequency at that fixed point in the area is lower than the variation frequency threshold value, the processing module 11 will set the highest value of the varying electromagnetic wave intensity at the fixed point (i.e., the non-disturbed electromagnetic wave intensity) as the to-be-processed data. For example, the area is a room through which many people may pass, and each time people pass through the room, the electromagnetic wave intensity at each fixed point in the room is affected or reduced to be exact. When people passing through the room is a normal state, i.e., when the variation frequency of the electromagnetic wave intensity is higher than the variation frequency threshold value (which is set at once every 10 minutes for example), the passing people should be viewed as a factor influencing the electromagnetic wave intensity. If, on the other hand, the variation frequency of the electromagnetic wave intensity is lower than the variation frequency threshold value, it is not necessary to view the passing people as a factor influencing the electromagnetic wave intensity.

The communication dead zone analysis step S03 is performed as follows, with the frequency band in use and an electromagnetic wave signal strength threshold value being set in advance. The processing module 11 receives from the storage module 12 the electromagnetic wave intensity at each fixed point in the area in the frequency band in use and creates an electromagnetic map according to the electronic map and the electromagnetic wave intensity at each fixed point. The electromagnetic map shows a communication dead zone. The communication dead zone is a region of the area that has an electromagnetic wave intensity lower than the electromagnetic wave signal strength threshold value. While presetting the electromagnetic wave signal strength threshold value, it is necessary to take into account the receiving device that a user would use to receive the electromagnetic wave. Take a 4G mobile phone made by a manufacturer in Taiwan for example. The 4G mobile phone tends to undergo signal transmission interruption when the electromagnetic wave intensity ranges from −90 dBm to −106 dBm, and will be unable to connect to any network when the electromagnetic wave intensity is lower than −107 dBm; in that case, the electromagnetic wave signal strength threshold value should be set at −90 dBm. That is to say, the electromagnetic wave signal strength threshold value should be set according to the region of interest and the regulations in applicable specifications. In the application examples given below, the electromagnetic wave signal strength threshold value is set at −90 dBm.

The improvement measure determination step S04 is performed as follows. The processing module 11 infers an electromagnetic wave source from the electromagnetic map and obtains an existing electromagnetic wave path. Then, the processing module 11 infers from the existing electromagnetic wave path, from the way the electromagnetic wave will be reflected by and/or pass through and/or bypass each electromagnetic wave guiding structure 3, and from the extent over which each electromagnetic wave guiding structure 3 radiates the electromagnetic wave, the installation position and type of at least one electromagnetic wave guiding structure assembly suitable for use to render the communication dead zone within the radiation extent of at least one electromagnetic wave guiding structure 3, to guide the electromagnetic wave from the existing electromagnetic wave path to the communication dead zone, and to enable the coverage ratio of the electromagnetic wave in the communication dead zone (i.e., the percentage in area of the communication dead zone that corresponds to the electromagnetic wave intensity being higher than the electromagnetic wave signal strength threshold value) to reach a coverage ratio threshold value. One example of the coverage ratio threshold value is 90%. The improvement measure determination step S04 includes the processing module 11 executing electromagnetic simulation software to carry out simulation computation. The electromagnetic wave can form at least one complete predicted electromagnetic wave path through at least one electromagnetic wave guiding structure assembly suitable for use, wherein each complete predicted electromagnetic wave path includes at least one predicted electromagnetic wave path. The electromagnetic wave can be guided from the existing electromagnetic wave path to the communication dead zone through at least one complete predicted electromagnetic wave path.

The selection step S05 includes the processing module 11 selecting one electromagnetic wave guiding structure assembly from at least one electromagnetic wave guiding structure assembly suitable for use, wherein the number of at least one electromagnetic wave guiding structure 3 in the selected electromagnetic wave guiding structure assembly is the smallest among at least one electromagnetic wave guiding structure assembly suitable for use. The display module 13 displays the selected electromagnetic wave guiding structure assembly and the corresponding complete predicted electromagnetic wave path, in order for the user to know the installation position and type of the selected electromagnetic wave guiding structure assembly from the display module 13. Thus, using the smallest number of electromagnetic wave guiding structures 3, the coverage ratio in the communication dead zone can be rendered equal to or higher than the coverage ratio threshold value to produce a satisfactory result at the lowest cost.

After the selected electromagnetic wave guiding structure assembly is deployed, the validation step S06 is performed as follows. The detection apparatus 2 detects the electromagnetic wave intensity in the communication dead zone, and the processing module 11 determines if the electromagnetic wave intensity in the communication dead zone is higher than the electromagnetic wave signal strength threshold value and if the percentage in area of the communication dead zone that corresponds to the electromagnetic wave intensity being higher than the electromagnetic wave signal strength threshold value is higher than the coverage ratio threshold value. If yes to both, the processing module 11 will determine that the communication dead zone has been improved.

Please note that if electromagnetic wave intensity variations over time need not be considered, the communication dead zone analysis step S03 can be directly performed without the measurement step S01 and the variation-over-time determination step S02 conducted in advance. In that case, the communication dead zone analysis step S03 will include directly setting the electronic map and the position of at least one signal transmitter (e.g., at least one base station) in the area into the processing module 11, wherein the electronic map may be existing data and is not necessarily obtained through detection by the locating device 22. The processing module 11 will then create the electromagnetic map directly according to the electronic map and the position of at least one base station. For example, a telecommunication service provider can use the processing module 11 to create the electromagnetic map according to an existing electronic map and the position of at least one base station on the electronic map.

The following paragraphs show applications of the disclosed method for deploying an electromagnetic wave guiding structure.

Figure 8A:
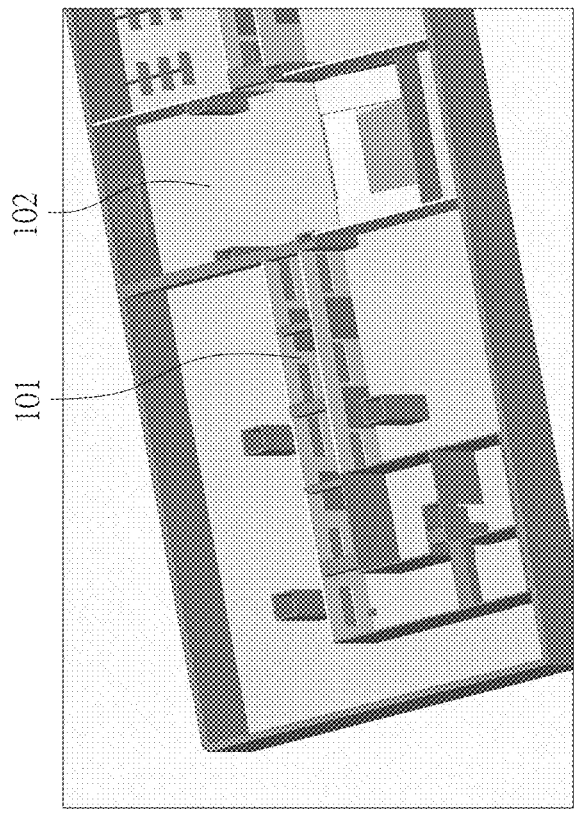
FIG. 8A schematically shows the first embodiment of the disclosed method for deploying an electromagnetic wave guiding structure and corresponds to a state before the deployment.
Figure 8B:
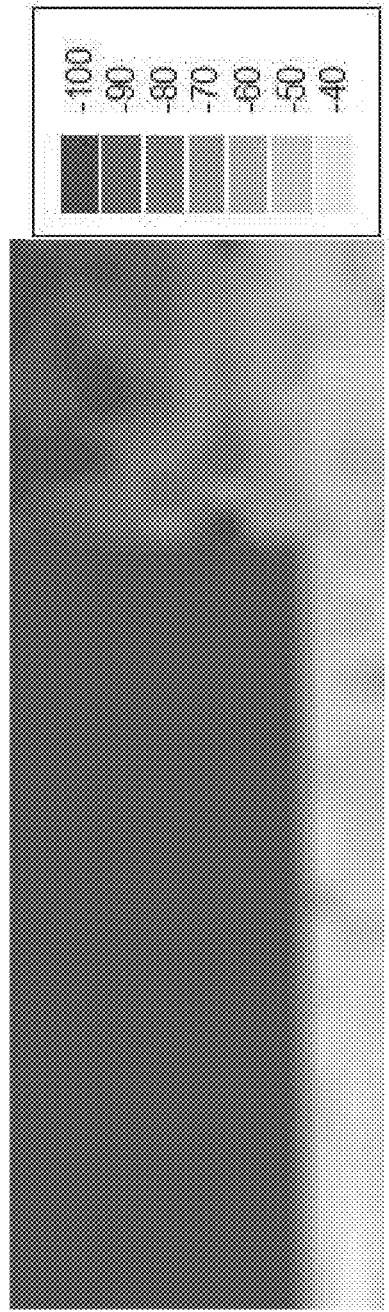
FIG. 8B is a before-deployment electromagnetic map of the first embodiment.
Figure 9A:
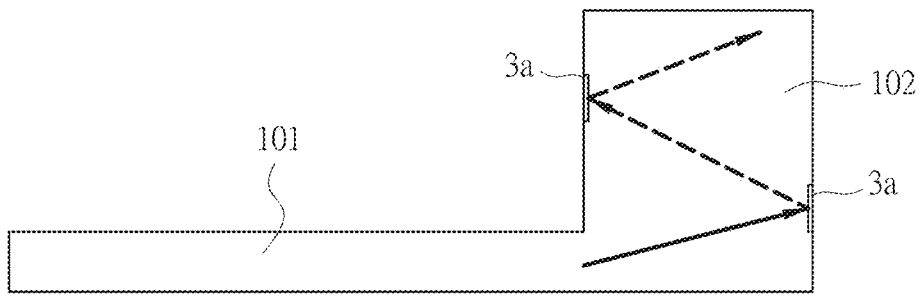
FIG. 9A is another schematic drawing showing the first embodiment of the disclosed method for deploying an electromagnetic wave guiding structure but corresponds to a state after the deployment.
Figure 9B:
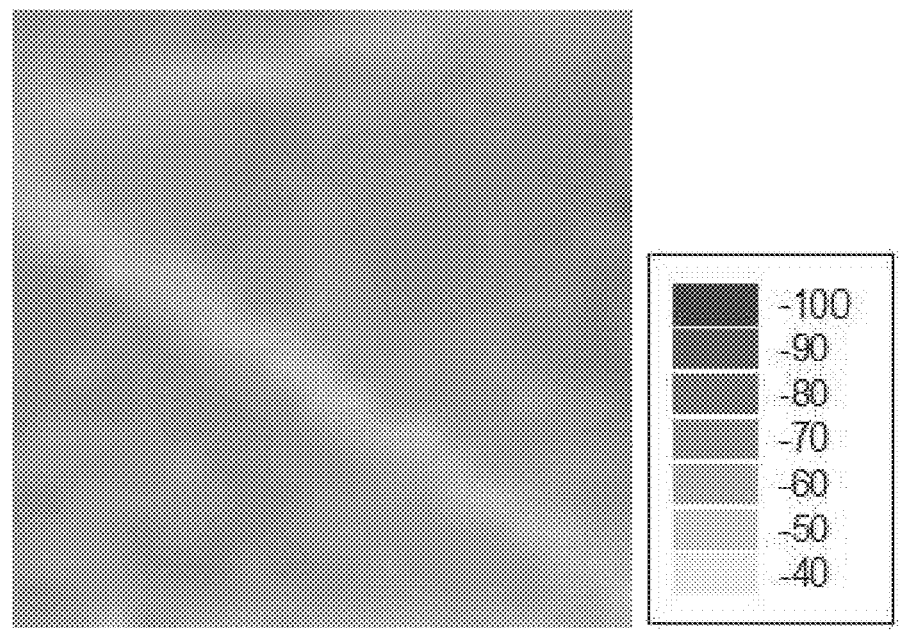
FIG. 9B is an after-deployment electromagnetic map of the first embodiment.
Figure 10A:
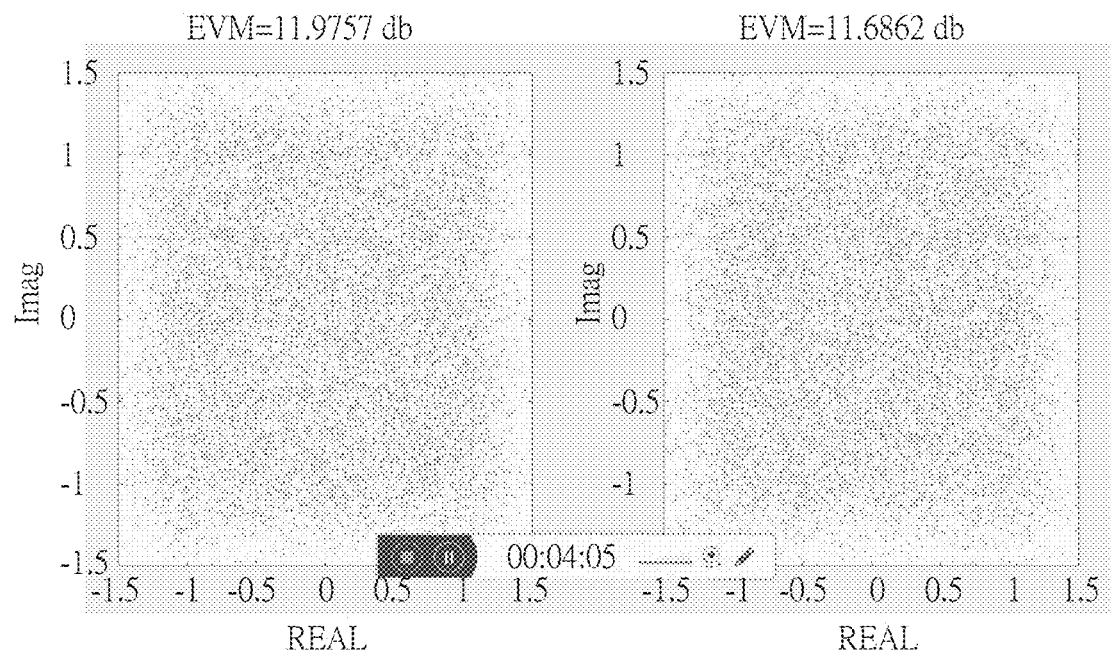
FIG. 10A shows constellation diagrams of the first embodiment obtained before the electromagnetic wave reflection structures are deployed.
Figure 10B:
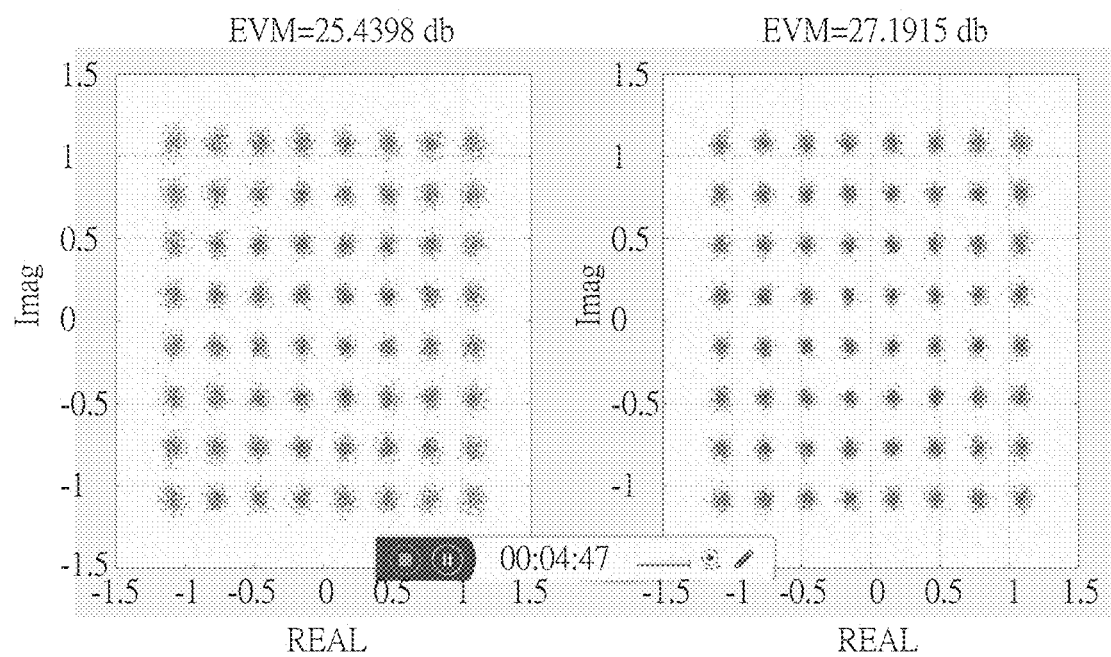
FIG. 10B shows constellation diagrams of the first embodiment obtained after the electromagnetic wave reflection structures are deployed.

Referring to FIG. 8A and FIG. 9A in conjunction with FIG. 1 for the first embodiment of the disclosed method for deploying an electromagnetic wave guiding structure, a long narrow corridor 101 lies between two laboratories and is in communication with a central corridor 102, and a base station is located at one end of the long narrow corridor 101. In the communication dead zone analysis step S03, an electromagnetic map corresponding to the frequency band in use, or more specifically 28 GHz, is obtained as shown in FIG. 8B, which shows that certain areas of the central corridor 102 have electromagnetic wave intensities lower than −90 dBm and are therefore the communication dead zone. In the improvement measure determination step S04 and the selection step S05, the processing module 11 selects an electromagnetic wave guiding structure assembly that consists of two electromagnetic wave reflection structures 3a, in order for the electromagnetic wave reflection structures 3a to reflect the electromagnetic wave to the communication dead zone. After the electromagnetic wave reflection structures 3a are deployed, the electromagnetic wave intensity at one of the fixed points in the central corridor 102 is increased by up to 32.3 dB (see FIG. 9B, which shows the electromagnetic map of the central corridor 102 alone), and the electromagnetic wave intensity at each fixed point in the central corridor 102 is increased by an average of 7.8 dB. In this embodiment, wireless transmission properties are also tested before and after the deployment of the electromagnetic wave reflection structures 3a, with the measuring frequency being 28 GHz, the quadrature amplitude modulation (QAM) format of the test is 64-QAM, and the bandwidth is 50 MHz. More specifically, a non-line-of-sight (NLOS) test is conducted on the communication dead zone before the deployment and produces the test results in FIG. 10A, which shows constellation diagrams that are too divergent to demodulate, and in which the left and right diagrams correspond to horizontal polarization and vertical polarization respectively. The NLOS test results obtained after the deployment are shown in FIG. 10B, which shows highly concentrated constellation diagrams, with the EVM reduced to less than −27 dB, and in which the left and right diagrams correspond to horizontal polarization and vertical polarization respectively. As can be known from the test results, the quality of communication is greatly enhanced after the electromagnetic wave reflection structures 3a are deployed.

Referring to FIG. 11 in conjunction with FIG. 1 and FIG. 2 for the second embodiment of the disclosed method for deploying an electromagnetic wave guiding structure, the existing electromagnetic wave path in a conference room is often blocked by people walking in the conference room. In the variation-over-time determination step S02, it is determined that the variation frequency of the electromagnetic wave intensity at each fixed point in the conference room in the frequency band in use is higher than the variation frequency threshold value; therefore, the processing module 11 sets the lowest value of the varying electromagnetic wave intensity at each fixed point in the conference room as the to-be-processed data. Then, it is determined in the communication dead zone analysis step S03 that the communication dead zone is a lower portion of the conference room, or more specifically the portion where people walk frequently. It is the walking people that result in the communication dead zone of the conference room. As the electromagnetic wave source is located below the communication dead zone, the communication dead zone and the electromagnetic wave source are located in different horizontal planes. In the improvement measure determination step S04 that follows, the processing module 11 infers the installation positions and types of two feasible electromagnetic wave guiding structure assemblies. Either assembly is located on the opposite side of the communication dead zone with respect to the electromagnetic wave source, i.e., on the side above the communication dead zone. One feasible electromagnetic wave guiding structure assembly includes two electromagnetic wave reflection structures 3a provided on each of an upper front wall portion and an upper rear wall portion of the conference room. Some of the predicted electromagnetic wave paths produced by the electromagnetic wave reflection structures 3a are much higher than the people in the conference room and therefore will not be blocked. Some other predicted electromagnetic wave paths produced by the electromagnetic wave reflection structures 3a extend to the lower portion of the conference room such that the electromagnetic wave is reflected and thereby guided to the communication dead zone.

Referring to FIG. 12 in conjunction with FIG. 1 and FIG. 2, the other feasible electromagnetic wave guiding structure assembly whose installation position and type have been inferred by the processing module 11 includes an electromagnetic wave reflection structure 3a provided in an upper portion of the conference room, or more specifically on the ceiling of the conference room. The electromagnetic wave propagating into the conference room impinges on the electromagnetic wave reflection structure 3a and is reflected by the electromagnetic wave reflection structure 3a to the communication dead zone to improve the quality of communication in the communication dead zone. It can be known from the second embodiment that, in cases where the communication dead zone and the electromagnetic wave source are located in different horizontal planes, the selected electromagnetic wave guiding structure assembly can be installed on the opposite side of the communication dead zone with respect to the electromagnetic wave source. In the arrangement shown in FIG. 12 for example, the electromagnetic wave reflection structure 3a is located above the communication dead zone in order for the communication dead zone to lie within the first conical shaped extent over which the electromagnetic wave reflection structure 3a radiates the electromagnetic wave, and hence for the electromagnetic wave reflection structure 3a to reflect the electromagnetic wave downward and thereby guide the electromagnetic wave to the communication dead zone.

Figure 13:
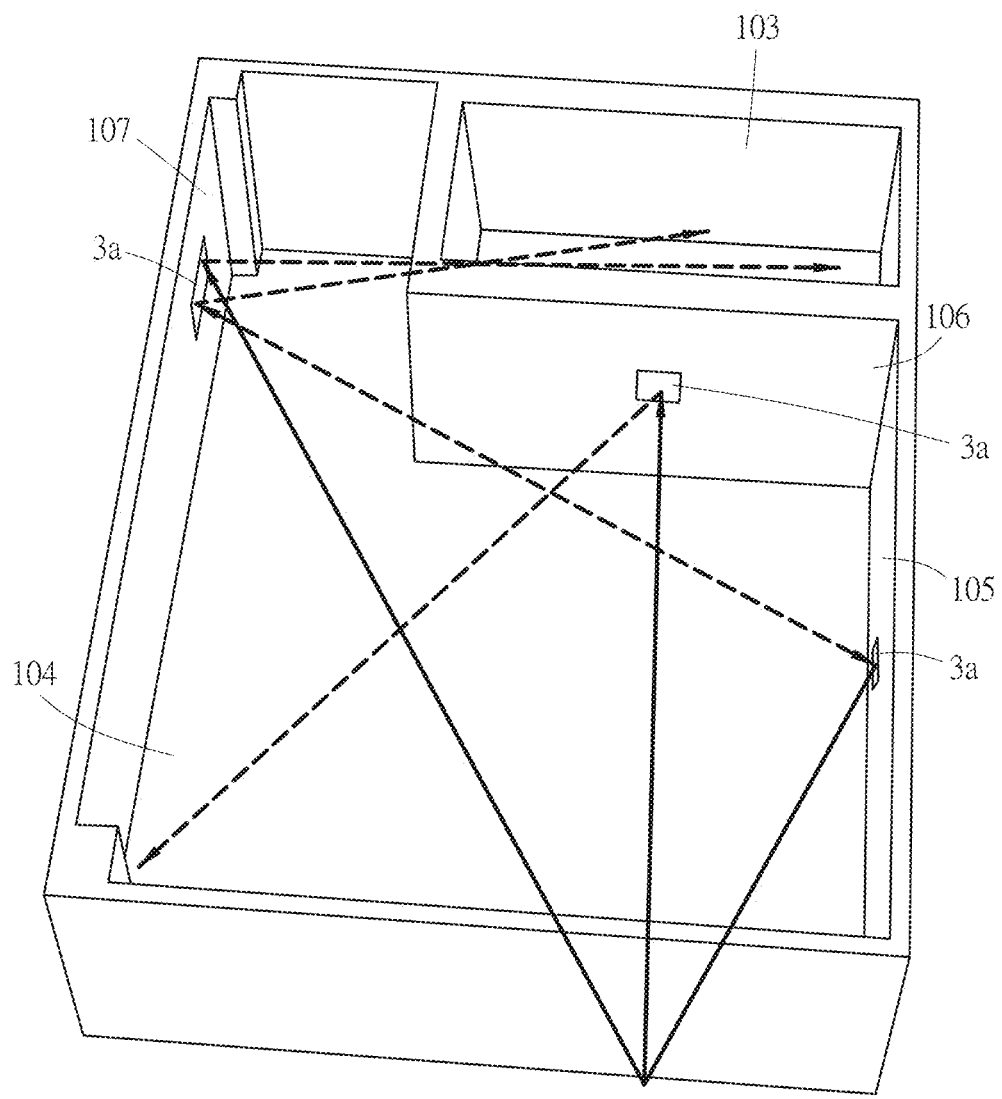
FIG. 13 schematically shows the third embodiment of the disclosed method for deploying an electromagnetic wave guiding structure.

Referring to FIG. 13 in conjunction with FIG. 1 and FIG. 2 for the third embodiment of the disclosed method for deploying an electromagnetic wave guiding structure, a studio apartment has two communication dead zones as determined in the communication dead zone analysis step S03. One of the communication dead zones is in the bathroom 103 of the studio apartment, and the other communication dead zone is in a corner 104 of the studio apartment. The electromagnetic wave propagating into the studio apartment is divided into three electromagnetic wave beams and thus forms three existing electromagnetic wave paths. To facilitate description, the existing electromagnetic wave paths are defined as a first existing electromagnetic wave path, a second existing electromagnetic wave path, and a third existing electromagnetic wave path respectively. The electromagnetic wave forming the first existing electromagnetic wave path impinges on the first wall 105. The electromagnetic wave forming the second existing electromagnetic wave path impinges on the second wall 106. The electromagnetic wave forming the third existing electromagnetic wave path impinges on the third wall 107. In the improvement measure determination step S04, the processing module 11 infers from each existing electromagnetic wave path the installation position and type of at least one electromagnetic wave guiding structure assembly suitable for use to form a complete predicted electromagnetic wave path. On each of the first wall 105, the second wall 106, and the third wall 107, therefore, an electromagnetic wave reflection structure 3a is installed. The electromagnetic wave reflection structure 3a on the first wall 105 reflects the incident electromagnetic wave to the electromagnetic wave reflection structure 3a on the third wall 107, which in turn reflects the incident electromagnetic wave into the bathroom 103. The installation positions and types of the electromagnetic wave guiding structure assemblies inferred respectively from the first existing electromagnetic wave path and the third existing electromagnetic wave path work in a partially overlapping manner. The electromagnetic wave reflection structure 3a on the second wall 106 reflects the incident electromagnetic wave to the corner 104 of the studio apartment.

Referring to FIG. 14A in conjunction with FIG. 1 and FIG. 2 for the same studio apartment as in FIG. 13, the processing module 11 infers another electromagnetic wave guiding structure assembly from the third existing electromagnetic wave path, and this electromagnetic wave guiding structure assembly includes an electromagnetic wave transmission structure 3b installed on a glass window on the fourth wall 108 and an electromagnetic wave reflection structure 3a installed on the third wall 107. The electromagnetic wave impinging on the electromagnetic wave transmission structure 3b on the fourth wall 108 passes through the electromagnetic wave transmission structure 3b, then impinges on the electromagnetic wave reflection structure 3a on the third wall 107, and is eventually guided to the communication dead zone by the electromagnetic wave reflection structure 3a.

Referring to FIG. 14B and FIG. 14C in conjunction with FIG. 14A, the after-deployment measurement result shows that the electromagnetic wave intensity at one of the fixed points in the bathroom 103 is increased by up to 33 dB, and that the electromagnetic wave intensity at each fixed point in the bathroom 103 is increased by an average of 11.6 dB, meaning the quality of communication in the bathroom 103 has been improved.

Figure 15:
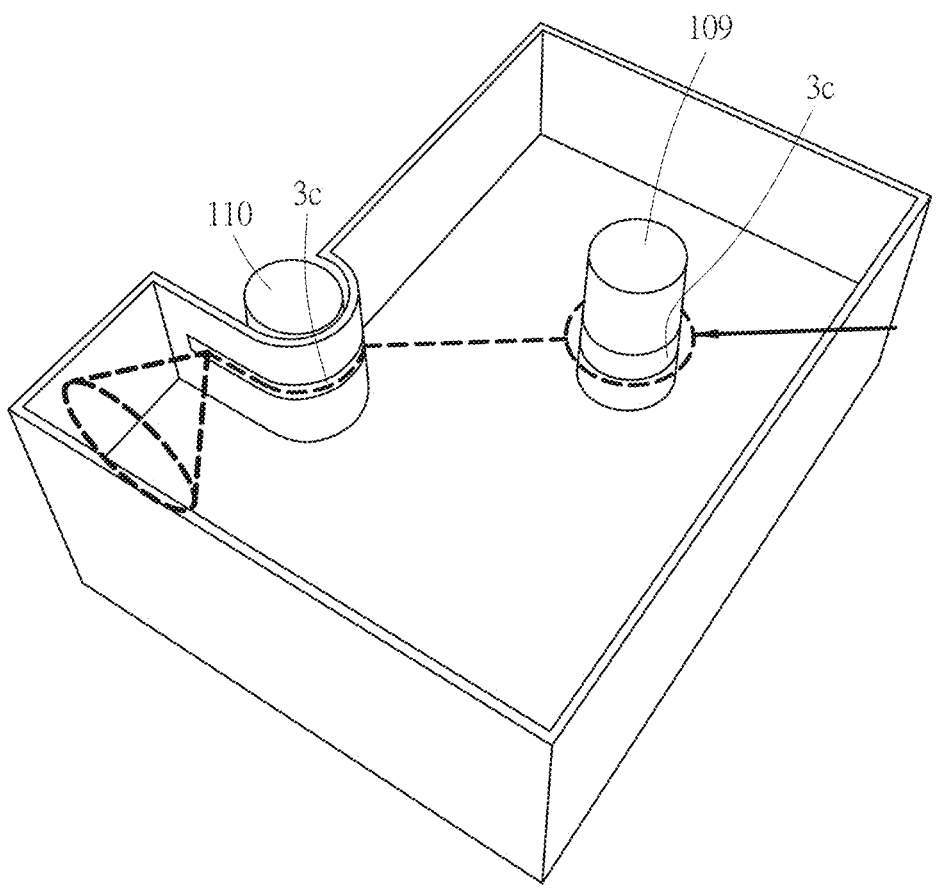
FIG. 15 schematically shows the fourth embodiment of the disclosed method for deploying an electromagnetic wave guiding structure.

Referring to FIG. 15 in conjunction with FIG. 1 and FIG. 2 for the fourth embodiment of the disclosed method for deploying an electromagnetic wave guiding structure, a library has a first column 109 and a second column 110, and it is determined in the communication dead zone analysis step S03 that the library has a communication dead zone in a corner beside the second column 110. The installation position and type of one of at least one electromagnetic wave guiding structure assembly suitable for use as inferred by the processing module 11 in the improvement measure determination step S04 are as follows. The first column 109 is coated with and surrounded by an electromagnetic wave bypass structure 3c, and a portion of the second column 110 is coated with another electromagnetic wave bypass structure 3c. The electromagnetic wave impinging on the electromagnetic wave bypass structure 3c on the first column 109 moves around the first column 109 to the rear side thereof, then impinges on the electromagnetic wave bypass structure 3c on the second column 110, and is eventually guided to the communication dead zone by the electromagnetic wave bypass structure 3c on the second column 110, wherein the communication dead zone lies in the third conical-shaped extent over which the electromagnetic wave bypass structure 3c on the second column 110 radiates the incident electromagnetic wave.

It is worth mentioning that the installation position of an electromagnetic wave reflection structure 3a is not limited to a wall of a building and may be an advertising board, a tree, a beam or column, a utility pole, or any other suitable locations. Moreover, an electromagnetic wave guiding structure 3 can be installed by being embedded into or adhesively bonded to an object.

It is also worth mentioning that the deployment of any electromagnetic wave guiding structure assembly requires the incident angle of the electromagnetic wave of interest to be taken into account. Therefore, each electromagnetic wave reflection structure 3a may further include an optical aligning device, and so may each electromagnetic wave transmission structure 3b and each electromagnetic wave bypass structure 3c, in order to facilitate the deployment of each electromagnetic wave reflection structure 3a, electromagnetic wave transmission structure 3b, or electromagnetic wave bypass structure 3c at the intended position.

Last but not least, it is worth mentioning that if the processing module 11 determines in the improvement measure determination step S04 that the coverage ratio of the electromagnetic wave in the communication dead zone cannot be rendered equal to or higher than the coverage ratio threshold value by any electromagnetic wave guiding structure assembly, the processing module 11 will then infer that at least one relay circuit should be used in addition to an electromagnetic wave guiding structure assembly, in order for at least one relay circuit to amplify the energy of the electromagnetic wave and thereby enable the coverage ratio of the electromagnetic wave in the communication dead zone to reach the coverage ratio threshold value. Or, if the processing module 11 determines in the improvement measure determination step S04 that the electromagnetic wave intensity in the communication dead zone is still lower than the electromagnetic wave signal strength threshold value after the electromagnetic wave is guided from the existing electromagnetic wave path to the communication dead zone by an electromagnetic wave guiding structure assembly, the processing module 11 will then infer that in addition to the electromagnetic wave guiding structure assembly, at least one relay circuit should be used to amplify the energy of the electromagnetic wave so that the electromagnetic wave has an electromagnetic wave intensity higher than the electromagnetic wave signal strength threshold value once guided to the communication dead zone.

In summary of the above, the communication dead zone analysis step S03 can identify the communication dead zone in the area of interest through an analysis process, and the improvement measure determination step S04 can infer the installation position and type of at least one electromagnetic wave guiding structure assembly suitable for use to guide the electromagnetic wave of interest to the communication dead zone and render the coverage ratio of the electromagnetic wave in the communication dead zone equal to or higher than the coverage ratio threshold value; thus, at least one solution is provided to address poor communication quality. Moreover, as the electromagnetic wave guiding structure assembly selected in the selection step S05 has the smallest number of electromagnetic wave guiding structures among at least one electromagnetic wave guiding structure assembly suitable for use, good communication quality can be achieved at the lowest cost. The variation-over-time determination step S02 is used to determine if the variation frequency of the electromagnetic wave intensity at each fixed point in the area of interest should be taken into consideration, and only by considering the variation frequency can a communication dead zone resulting from the electromagnetic wave varying over time in the area be eliminated. The detection apparatus 2 performs the measurement step S01 to help the processing module 11 create the electronic map of the area of interest so that the processing module 11 can detect the electromagnetic wave intensity in the area automatically and accurately. It is preferable that the supporting base 212 allows the receiving element 231 to be adjusted in position in the height direction in a controlled manner so that the detection apparatus 2 is subject to few limitations when performing detection in the height direction. The communication dead zone analysis step S03 is so designed that the processing module 11 can create the electromagnetic map not only according to the electronic map and the electromagnetic wave intensity at each fixed point in the area of interest in the frequency band in use, but also directly according to the electronic map and the position of at least one signal transmitter in the area. When the communication dead zone is higher than the electromagnetic wave source, at least one electromagnetic wave reflection structure 3a can be installed above the communication dead zone to guide the electromagnetic wave to the communication dead zone. Besides, the deployment of an electromagnetic wave guiding structure 3 can be made easier by the optical aligning device of the electromagnetic wave reflection structure 3a, electromagnetic wave transmission structure 3b, and/or electromagnetic wave bypass structure 3c forming the electromagnetic wave guiding structure 3. In addition, the processing module 11 can infer in the improvement measure determination step S04 if at least one relay circuit should be used to amplify the energy of the electromagnetic wave in order to achieve good communication quality.

The description of the foregoing embodiments should be able to enable a full understanding of the operation, use, and effects of the method disclosed herein. Those embodiments, however, are only some preferred ones of the present disclosure and are not intended to be restrictive of the scope of the disclosure. All simple equivalent changes and modifications based on the disclosure of this specification and the appended claims shall fall within the scope of the disclosure.

What is claimed is:

1. A method for deploying an electromagnetic wave guiding structure, comprising:
   a communication dead zone analysis step, to be performed with a frequency band in use and an electromagnetic wave signal strength threshold value being set in advance, for creating an electromagnetic map for an electromagnetic wave intensity over an area in the frequency band in use, by a processing module according to an electronic map of the area, wherein the area has a region with the electromagnetic wave intensity lower than the electromagnetic wave signal strength threshold value, and the electromagnetic map shows the region as a communication dead zone; and an improvement measure determination step, to be performed by the processing module, for obtaining an existing electromagnetic wave path according to the electromagnetic map and inferring from the existing electromagnetic wave path an installation position and a type of at least one electromagnetic wave guiding structure assembly suitable for use to guide an electromagnetic wave from the existing electromagnetic wave path to the communication dead zone and to render a coverage ratio of the electromagnetic wave in the communication dead zone equal to or higher than a coverage ratio threshold value, each said electromagnetic wave guiding structure assembly including at least one said electromagnetic wave guiding structure, each said electromagnetic wave guiding structure including at least one of an electromagnetic wave reflection structure, an electromagnetic wave transmission structure, and an electromagnetic wave bypass structure, wherein the electromagnetic wave reflection structure reflects the electromagnetic wave when the electromagnetic wave impinges on the electromagnetic wave reflection structure, the electromagnetic wave transmission structure allows passage, and causes convergence of energy, of the electromagnetic wave after the electromagnetic wave impinges on the electromagnetic wave transmission structure, and the electromagnetic wave bypass structure causes the electromagnetic wave to move around the electromagnetic wave bypass structure after the electromagnetic wave impinges on and before the electromagnetic wave leaves the electromagnetic wave bypass structure.

2. The method for deploying an electromagnetic wave guiding structure as claimed in claim 1, wherein in the communication dead zone analysis step, the processing module creates the electromagnetic map according to the electronic map and the electromagnetic wave intensity at each of a plurality of fixed points in the area in the frequency band in use.

3. The method for deploying an electromagnetic wave guiding structure as claimed in claim 1, wherein in the communication dead zone analysis step, the processing module creates the electromagnetic map according to the electronic map and a position of at least one signal transmitter in the area.

4. The method for deploying an electromagnetic wave guiding structure as claimed in claim 1, further comprising a selection step, to be performed by the processing module after the improvement measure determination step, for selecting a said electromagnetic wave guiding structure assembly from the at least one electromagnetic wave guiding structure assembly suitable for use, wherein the number of the at least one electromagnetic wave guiding structure in the selected electromagnetic wave guiding structure assembly is the smallest among the at least one electromagnetic wave guiding structure assembly suitable for use.

5. The method for deploying an electromagnetic wave guiding structure as claimed in claim 1, further comprising a variation-over-time determination step, to be performed by the processing module before the communication dead zone analysis step, for determining if the electromagnetic wave intensity at each of a plurality of fixed points in the area in the frequency band in use varies over time at a variation frequency higher than a variation frequency threshold value, and for setting a lowest value of the electromagnetic wave intensity varying at each said fixed point in the area as to-be-processed data if the variation frequency at the each said fixed point is higher than the variation frequency threshold value, or setting a highest value of the electromagnetic wave intensity varying at each said fixed point in the area as the to-be-processed data if the variation frequency at the each said fixed point is lower than the variation frequency threshold value.

6. The method for deploying an electromagnetic wave guiding structure as claimed in claim 1, further comprising a measurement step, to be performed by a detection apparatus before the communication dead zone analysis step, for detecting the electromagnetic wave intensity at each of a plurality of fixed points in the area in the frequency band in use while the detection apparatus is moved in the area, wherein the detection apparatus includes a moving device, a locating device, and a detecting device, the moving device is automatically movable in a controlled manner, the locating device and the detecting device are provided at the moving device, the locating device generates locating coordinates according to each said fixed point the moving device has moved to, the processing module creates the electronic map of the area according to the locating coordinates, and the detecting device measures the electromagnetic wave intensity at each said fixed point.

7. The method for deploying an electromagnetic wave guiding structure as claimed in claim 6, wherein the moving device includes a main body and a supporting base, the supporting base is provided at the main body, the detecting device includes a receiving element, the receiving element is provided at the supporting base, the main body is movable in a controlled manner in a horizontal plane in the area, and the supporting base allows the receiving element to be moved in a controlled manner in a height direction perpendicular to the horizontal plane.

8. The method for deploying an electromagnetic wave guiding structure as claimed in claim 6, wherein the moving device is an unmanned aerial vehicle, and the unmanned aerial vehicle is movable in a controlled manner in a horizontal plane in the area and in a height direction perpendicular to the horizontal plane.

9. The method for deploying an electromagnetic wave guiding structure as claimed in claim 6, further comprising a validation step, to be performed after the improvement measure determination step, for detecting the electromagnetic wave intensity in the communication dead zone by the detection apparatus and determining, by the processing module, if the electromagnetic wave intensity in the communication dead zone is higher than the electromagnetic wave signal strength threshold value and if the coverage ratio of the electromagnetic wave in the communication dead zone has reached the coverage ratio threshold value.

10. The method for deploying an electromagnetic wave guiding structure as claimed in claim 1, wherein in the improvement measure determination step, the processing module infers an electromagnetic wave source from the electromagnetic map and, if the communication dead zone and the electromagnetic wave source are located in different horizontal planes, the installation position of one of the at least one electromagnetic wave guiding structure assembly suitable for use as inferred by the processing module is on an opposite side of the communication dead zone with respect to the electromagnetic wave source.

11. The method for deploying an electromagnetic wave guiding structure as claimed in claim 1, wherein each said electromagnetic wave reflection structure radiates the electromagnetic wave over an extent of a first conical shape and defines an apex of the first conical shape, with a first included angle formed between a height of the first conical shape and a generatrix of the first conical shape; each said electromagnetic wave transmission structure radiates the electromagnetic wave over an extent of a second conical shape and defines an apex of the second conical shape, with a second included angle formed between a height of the second conical shape and a generatrix of the second conical shape; each said electromagnetic wave bypass structure radiates the electromagnetic wave over an extent of a third conical shape and defines an apex of the third conical shape, with a third included angle formed between a height of the third conical shape and a generatrix of the third conical shape; and in the improvement measure determination step, the processing module infers the at least one electromagnetic wave guiding structure assembly suitable for use from the existing electromagnetic wave path, properties of each said electromagnetic wave reflection structure, properties of each said electromagnetic wave transmission structure, and properties of each said electromagnetic wave bypass structure, wherein the properties of a said electromagnetic wave reflection structure include how the electromagnetic wave reflection structure guides the electromagnetic wave and the extent of radiation of the electromagnetic wave by the electromagnetic wave reflection structure, the properties of a said electromagnetic wave transmission structure include how the electromagnetic wave transmission structure guides the electromagnetic wave and the extent of radiation of the electromagnetic wave by the electromagnetic wave transmission structure, and the properties of a said electromagnetic wave bypass structure include how the electromagnetic wave bypass structure guides the electromagnetic wave and the extent of radiation of the electromagnetic wave by the electromagnetic wave bypass structure.

12. The method for deploying an electromagnetic wave guiding structure as claimed in claim 1, wherein in the improvement measure determination step, the processing module, upon determining that the coverage ratio of the electromagnetic wave in the communication dead zone is unable to be rendered equal to or higher than the coverage ratio threshold value by any said electromagnetic wave guiding structure assembly, infers that a said electromagnetic wave guiding structure assembly should be used in conjunction with at least one relay circuit.

13. The method for deploying an electromagnetic wave guiding structure as claimed in claim 1, wherein in the improvement measure determination step, the processing module, upon determining that the electromagnetic wave intensity in the communication dead zone is unable to be rendered equal to or higher than the electromagnetic wave signal strength threshold value by any said electromagnetic wave guiding structure assembly guiding the electromagnetic wave from the existing electromagnetic wave path to the communication dead zone, infers that a said electromagnetic wave guiding structure assembly should be used in conjunction with at least one relay circuit.

\* \* \* \* \*